US011830127B1

(12) United States Patent
Arbit

(10) Patent No.: US 11,830,127 B1
(45) Date of Patent: Nov. 28, 2023

(54) SYSTEMS AND METHODS FOR GENERATING CONSISTENTLY SHARP, DETAILED, AND IN-FOCUS THREE-DIMENSIONAL MODELS FROM PIXELS OF TWO-DIMENSIONAL IMAGES

(71) Applicant: Illuscio, Inc., Culver City, CA (US)

(72) Inventor: Gregory Arbit, Valley Village, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/310,889

(22) Filed: May 2, 2023

(51) Int. Cl.
*G06T 15/20* (2011.01)
*G06T 15/00* (2011.01)

(52) U.S. Cl.
CPC .......... *G06T 15/205* (2013.01); *G06T 15/005* (2013.01)

(58) Field of Classification Search
CPC ............................ G06T 15/205; G06T 15/005
See application file for complete search history.

(56) References Cited

U.S. PATENT DOCUMENTS

| | | |
|---|---|---|
| 2003/0016218 A1 | 1/2003 | Zwicker et al. |
| 2003/0071194 A1 | 4/2003 | Mueller et al. |
| 2003/0151611 A1 | 8/2003 | Turpin et al. |
| 2005/0237336 A1 | 10/2005 | Guhring et al. |
| 2006/0017741 A1 | 1/2006 | Sekine et al. |
| 2009/0122148 A1* | 5/2009 | Fife ...................... H04N 13/282 348/E5.024 |
| 2015/0062370 A1* | 3/2015 | Shroff ..................... G06T 7/571 348/222.1 |
| 2018/0098047 A1 | 4/2018 | Itakura et al. |
| 2018/0144492 A1* | 5/2018 | Vandame .......... H01L 27/14627 |
| 2021/0280322 A1 | 9/2021 | Frank et al. |
| 2023/0186434 A1* | 6/2023 | Thurston, III ............ G06T 7/50 345/419 |

\* cited by examiner

*Primary Examiner* — Michelle Chin
(74) *Attorney, Agent, or Firm* — Ansari Katiraei LLP; Arman Katiraei; Sadiq Ansari

(57) ABSTRACT

Disclosed is a system and associated methods for generating a consistently sharp, detailed, and in-focus three-dimensional ("3D") model of an object from two-dimensional ("2D") images that collectively capture all sides of the object with multiple depths-of-field. The system receives a set of 2D images that capture a particular part of the object with different depths-of-field. The system determines a first pixel from a first 2D image and a second pixel from a second 2D image that represent a common point of the object, determines that the first pixel is out of focus based on the first 2D image depth-of-field and that the second pixel is in focus based on the second 2D image depth-of-field, and defines a 3D construct, that represents the common point in a 3D model of the object, using data of the in-focus second pixel instead of data of the out-of-focus first pixel.

18 Claims, 6 Drawing Sheets

SYSTEMS AND METHODS FOR GENERATING CONSISTENTLY SHARP, DETAILED, AND IN-FOCUS THREE-DIMENSIONAL MODELS FROM PIXELS OF TWO-DIMENSIONAL IMAGES

BACKGROUND

Photogrammetry is a process for generating a three-dimensional ("3D") model of an object or scene from two-dimensional ("2D") images that capture the object or scene from different angles or sides. However, since the 2D images have inconsistent levels-of-detail, areas that transition from being in-focus to out-of-focus, and differing degrees of sharpness, the 3D model that is derived from these 2D images will inherit these same inconsistencies.

The inconsistencies in the 2D images may be caused by a limited depth-of-field. For instance, parts of the object or scene that are outside the depth-of-field will be captured with less detail, less sharpness, and/or out-of-focus than other parts of the object or scene that are in the depth-of-field.

The inconsistencies in the 2D images may also be caused by lens effects. Parts of the object or scene that are captured at the periphery of a camera lens may experience vignetting and/or distortions. The vignetting and/or distortions results in pixels at the image periphery being less detailed, sharp, or out-of-focus as compared to pixels at the image center. Similarly, different camera lens capture the object or scene with different amounts of falloff such that pixels at the center of the 2D image may be sharper, more detailed, and/or more in focus than pixels that are farther from the image center.

These inconsistencies in the captured 2D images transfer to the 3D model. In some instance, the inconsistencies become more pronounced in the 3D model as the 3D model is generated from different sets of pixels from different parts of the 2D images leading to a 3D model that fluctuates between being sharp, detailed, and in-focus in a first set of regions and blurry, less detailed, and out-of-focus in second set of regions that are intermixed with the first set of regions.

DETAILED DESCRIPTION OF PREFERRED EMBODIMENTS

The following detailed description refers to the accompanying drawings. The same reference numbers in different drawings may identify the same or similar elements.

Provided are systems and methods for generating a consistently sharp, detailed, and in-focus three-dimensional ("3D") model of an object or scene from pixels of two-dimensional ("2D") images that collectively capture all sides of the object or scene from different positions, angles, perspectives, and/or distances. To generate the consistently sharp, detailed, and in-focus 3D model, a 3D generation system obtains multiple 2D images that capture the object or scene from the same side or perspective with different depths-of-field. Each 2D image of the multiple 2D images has a different part of the object or scene in-focus. The 3D generation system generates a fully in-focus composite 2D image of the object or scene from a particular side or perspective by combining the in-focus pixels from each of the multiple 2D images that capture the object or scene from the particular side or perspective with a different depth-of-field. The 3D generation system generates the 3D model of the object or scene from the in-focus pixels of the composite 2D images that collectively capture all sides or perspectives of the object or scene. In some embodiments, the 3D generation system generates the 3D constructs that define the form or structure of the 3D model using a photogrammetry technique, and colorizes the 3D constructs by mapping color values from aligned in-focus pixels of the fully in-focus composite 2D images to the 3D constructs. Consequently, the 3D constructs inherit the level-of-detail, sharpness, and in-focus qualities of the in-focus pixels, thereby producing a 3D model that has consistent detail and sharpness across all sides and surfaces formed by the 3D constructs.

Figure 1:
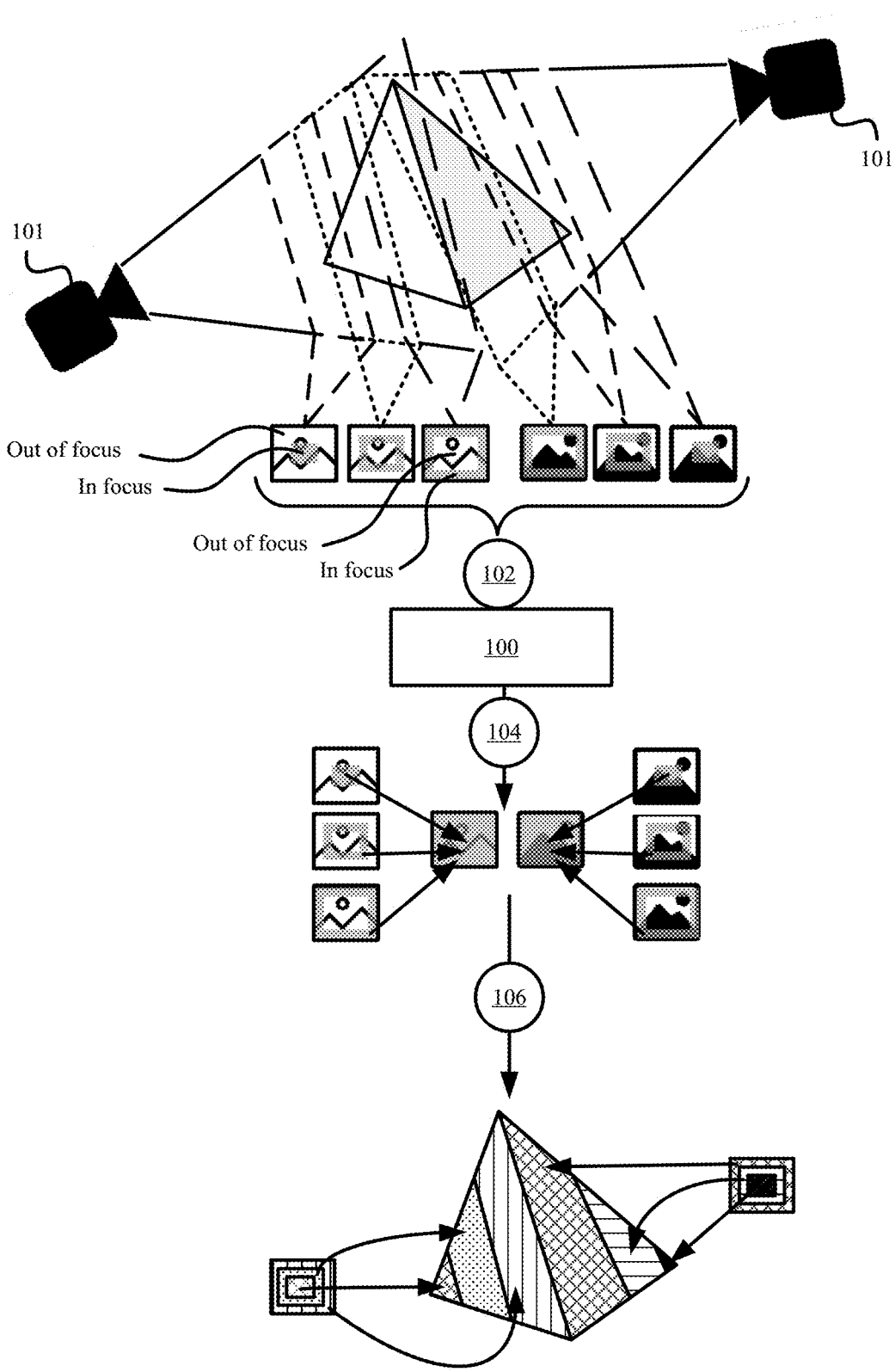
FIG. 1 illustrates an example of generating a consistently sharp, detailed, and in-focus three-dimensional ("3D") model of an object using select pixels from multiple two-dimensional ("2D") images that capture the same side or perspective of the object with different depths-of-field in accordance with some embodiments presented herein.

FIG. 1 illustrates an example of generating a consistently sharp, detailed, and in-focus 3D model of an object using select pixels from multiple 2D images that capture the same side or perspective of the object with different depths-of-field in accordance with some embodiments presented herein. 3D generation system 100 generates the in-focus 3D model from different sets of 2D images that are captured by at least one imaging device 101.

Imaging device 101 corresponds to a camera or other sensor that generates 2D color captures of the object. As shown in FIG. 1, imaging device 101 takes multiple 2D images of the object from different positions, angles, perspectives, and/or distances. Specifically, imaging device 101 captures each side or perspective of the object with a set of two or more 2D images that have different depths-of-field. Each depth-of-field places a different part from the imaged side of the object in focus.

Imaging device 101 changes the depth-of-field by changing the focal length via exposure setting adjustments (e.g., aperture adjustments, focus distance, etc.) or changing the lens focus or zoom. Imaging device 101 may also change the depth-of-field by keeping the exposure and lens settings fixed, and by moving imaging device 101 closer or further away from the particular side or perspective of the object that is being imaged.

3D generation system 100 receives (at 102) each set of 2D images that captures a different side of the object with different depths-of-field. In some embodiments, 3D generation system 100 receives (at 102) each set of 2D images as they are generated by imaging device 101. In some other embodiments, 3D generation system 100 receives (at 102) each set of 2D images after the imaging of the object from all sides and/or perspectives is complete, and upon initiating a 3D model generation procedure.

3D generation system 100 combines (at 104) the in-focus pixels from each set of 2D images taken from a different side or perspective of the object to generate a fully in-focus 2D composite image for that side or perspective of the object. In some embodiments, 3D generation system 100 analyzes the metadata of each 2D image to determine or calculate the depth-of-field, and selects the in-focus pixels from each image based on the analysis. In some other embodiments, 3D generation system 100 compares the 2D images from the same set of 2D images at different depths-of-field to detect and differentiate the in-focus pixels from the out-of-focus pixels. For instance, the out-of-focus pixels may be blurry, have color bleeding, and less distinct color transitions than the in-focus pixels. Accordingly, the in-focus pixels represent sharper and more detailed regions of a 2D image. In some embodiments, 3D generation system 100 aligns the set of 2D images taken from the same side or perspective of the object, and constructs the fully in-focus composite 2D image from different sets of selected in-focus pixels that collectively produce a fully in-focus representation of the imaged side or perspective of the object. In some embodiments, 3D generation system 100 uses one or more focus stacking techniques to generate the fully in-focus composite image.

3D generation system 100 generates (at 106) a 3D model from the fully in-focus composite 2D images of the different sides and perspectives of the object. Specifically, 3D generation system 100 identifies common points of the object as captured from the different sides and perspectives, determines a 3D position for each of the common points based on an amount by which each common point is distorted, skewed, or otherwise imaged differently from the different sides and perspectives, defines a point cloud data point, mesh, polygon, or other 3D construct in a 3D space at the determined 3D position, and colorizes or attributes visual characteristics to the defined 3D construct using the color values of the one or more in-focus pixels that capture the represented point. Since the 3D construct inherits its visual characteristics from the one or more in-focus pixels, the 3D construct retains and/or inherits the same detail and sharpness of the in-focus pixels. Consequently, the 3D constructs have a consistent focus, detail, and sharpness across the 3D model as a result of being derived from the in-focus pixels of the fully in-focus composite 2D images. In some embodiments, generating (at 106) the 3D model involves using a photogrammetry technique to define the 3D constructs of the 3D model from the fully in-focus composite 2D images.

Figure 2:
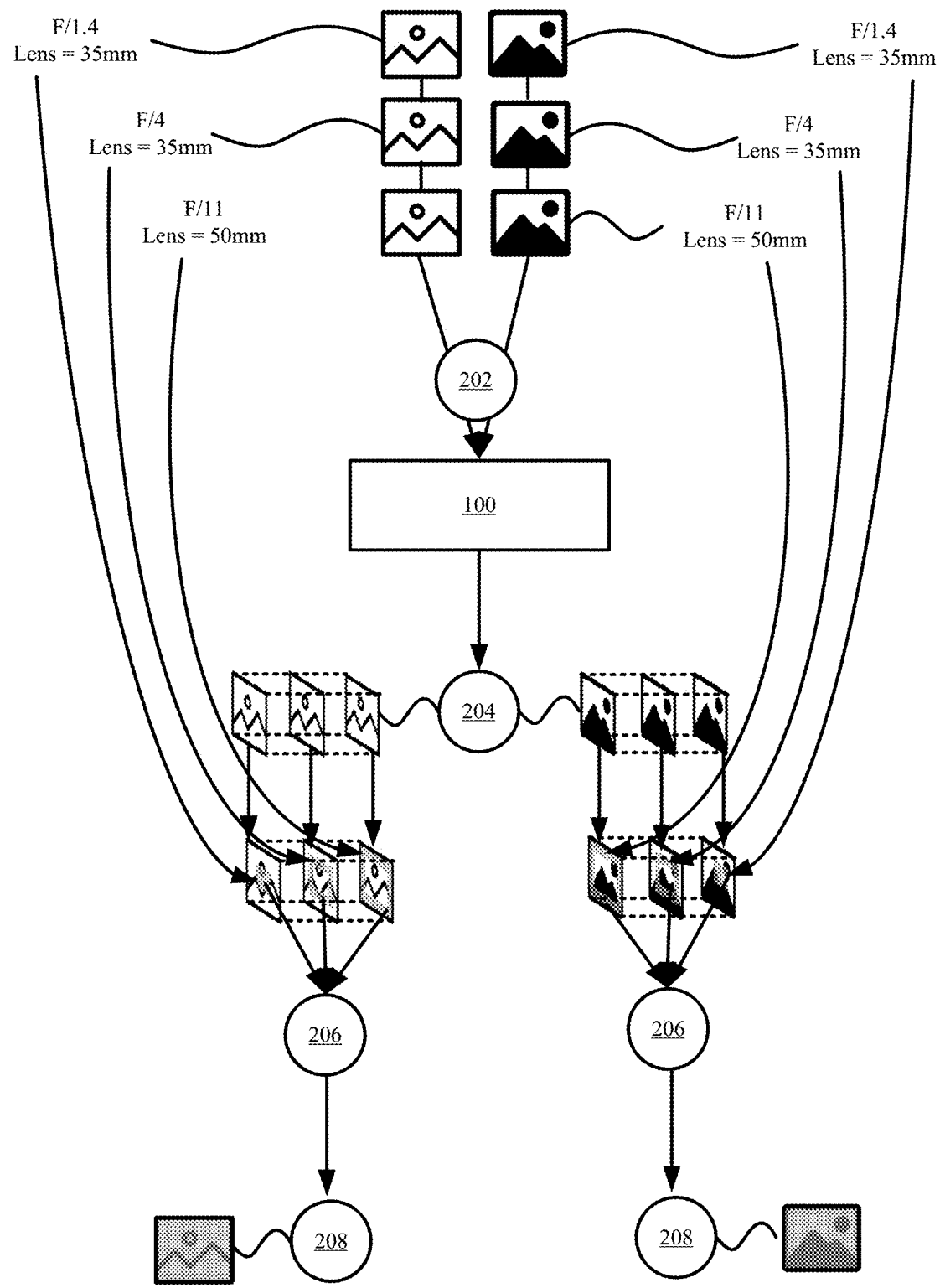
FIG. 2 illustrates an example of generating a fully in-focus composite image from a set of 2D images that capture an object from a particular side or perspective with different depths-of-field in accordance with some embodiments presented herein.

FIG. 2 illustrates an example of generating a fully in-focus composite image from a set of 2D images that capture an object from a particular side or perspective with different depths-of-field in accordance with some embodiments presented herein. 3D generation system 100 receives (at 202) the set of 2D images.

In some embodiments, the set of 3D images capture the particular side or perspective of the object from the same position but with different regions of the particular side or perspective being in-focus. For instance, the aperture setting of imaging device 101 may change with each 2D image without the position of imaging device 101 changing. In some other embodiments, the exposure and lens settings of imaging device 101 are not changed. However, the position of imaging device 101 is changed with each 2D image such that a different region of the particular side or perspective of the object is in-focus.

The image metadata stores the values for determining the depth-of-field. For instance, the image metadata stores the focal length, exposure settings, lens properties, and/or other camera settings from which the depth-of-field may be derived. In some embodiments, the image metadata directly specifies the depth-of-field and/or the pixels of the image that are in focus.

3D generation system 100 aligns (at 204) the set of 2D images. Aligning (at 204) the set of 2D images includes aligning the pixels that represent the same points of the object in different 2D images relative to one another. In some embodiments, aligning (at 204) the set of 2D images includes placing the 2D images in different layers with pixels represents common points of the object being at the same position in each layer.

3D generation system 100 blends (at 206) the aligned set of 2D images to retain the in-focus pixels from each 2D image. In some embodiments, 3D generation system 100 references the image metadata to identify and select the in-focus pixels from each 2D image. In some such embodiments, 3D generation system 100 uses the image metadata to calculate the depth-of-field. For instance, 3D generation system 100 uses image metadata values for the aperture setting, focal length, circle of confusion, and/or distance to the subject in order to calculate the depth-of-field, and isolate the in-focus pixels based on the calculated depth-of-field. The depth-of-field may identify the number of pixels from the center of the image to select as the in-focus pixels. In some other embodiments, the in-focus pixels are directly tagged or identified in the image metadata. In still some other embodiments, 3D generation system 100 determines the in-focus pixels by comparing and/or analyzing the pixels or different regions of the image, and by differentiating the in-focus pixels that are sharp and do not experience color bleeding from out-of-focus pixels that are blurry and experience color bleeding. Accordingly, 3D generating system 100 may perform a contrast and/or sharpness comparison between pixels of the aligned set of 2D of images to differentiate between the in-focus and out-of-focus pixels representing the same point of an object. The contrast and/or sharpness comparison may include comparing the aligned set of 2D images relative to one another to identify the in-focus pixels in each image that represent distinct parts of the imaged object with the greatest level of detail, contrast, and/or sharpness.

3D generation system 100 generates (at 208) a fully in-focus composite image using the in-focus pixels that are retained from two or more different 2D images of each aligned set of 2D images. The fully in-focus composite image presents the imaged side or perspective of the object that may contain different focal planes with pixels that are sharp, detailed, and in-focus. In other words, the blurry, lower detail, and out-of-focus parts of each 2D image from an aligned set of 2D images are removed so that the fully in-focus composite image is defined using only the in-focus pixels that represent the different focal planes of the imaged side or perspective of the object with a consistent sharpness and detail that corresponds to the highest level of sharpness and detail that the camera or imaging device 101 is able to capture when everything is in focus.

Figure 3:
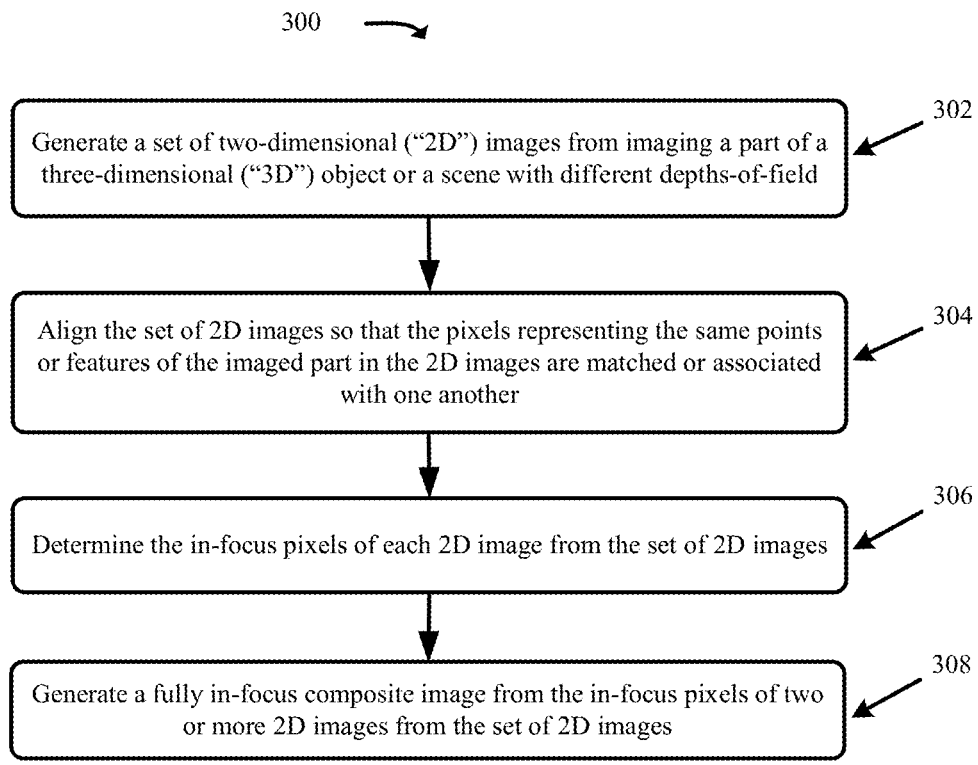
FIG. 3 presents a process for generating a fully in-focus composite image in accordance with some embodiments presented herein.

FIG. 3 presents a process 300 for generating a fully in-focus composite image in accordance with some embodiments presented herein. Process 300 is implemented by 3D generation system 100. 3D generation system 100 includes one or more devices or machines with processor, memory, storage, network, and/or other hardware resources for the generation of 3D models from 2D images. 3D generation system 100 may also support the editing, processing, and/or other interactions with the 3D models. For instance, 3D generation system 100 may be used to create 3D animations, 3D games, virtual reality, mixed reality, or augmented reality environments, and/or other 3D objects or environments.

Process 300 includes generating (at 302) a set of 2D images from imaging a part of a 3D object or a scene with different depths-of-field. Accordingly, the set of 2D images capture the same part of the object or the scene but with different aspects of the captured part being in and out of focus in the set of 2D images. The depth-of-field may be changed for each 2D image by changing one or more of the camera's exposure settings, lens settings, and/or camera distance relative to the imaged part of the object or scene.

Process 300 includes aligning (at 304) the set of 2D images so that the pixels representing the same points or features of the imaged part in the 2D images are matched or associated with one another. If the camera position does not change when generating (at 302) the set of 2D images, aligning (at 304) the set of 2D images involves overlaying the 2D images atop one another or in different layers of an image editing application. If the camera position changes when generating (at 302) the set of 2D images, aligning (at 304) the set of 2D images may include resizing, skewing, or otherwise adjusting one or more of the 2D images so that the same imaged features, surfaces, or elements of the imaged part of the object or scene are aligned.

Process 300 includes determining (at 306) the in-focus pixels of each 2D image from the set of 2D images. 3D generation system 100 determines (at 306) the in-focus pixels based on one or more of the 2D image metadata, comparison of the pixels at different regions of the same 2D image, or comparison of the same regions as captured by each 2D image of the set of 2D images. For instance, the in-focus pixels may be differentiated from the out-of-focus pixels as a result of having a threshold level of sharpness, detail, contrast, and/or color accuracy. Alternatively, the in-focus pixels may be differentiated from the out-of-pixels based on the exposure settings associated with each image and/or by calculating the near plane and the far plane for the depth-of-field captured by each 2D image, and selecting the pixels that fall between the near and far planes of each 2D image as the in-focus pixels.

Process 300 includes generating (at 308) a fully in-focus composite image from the in-focus pixels of two or more 2D images from the set of 2D images. In some embodiments, when two or more 2D images have in-focus pixels for the same points or surfaces of the object or scene, 3D generation system 100 may combine or merge the color values of the in-focus pixels from the two or more 2D images to define the in-focus pixels of the fully in-focus composite image. In some other embodiments, 3D generation system 100 may analyze the in-focus pixels of each 2D image to select whichever in-focus pixels capture the same points or surfaces of the object or scene with greater detail or sharpness. For instance, points or surfaces that are imaged with a first aperture or F-stop value may capture finer detail than the same points or surfaces that are imaged with a second aperture or F-stop value. As another example, in-focus pixels that are captured at the edge of a first depth-of-field may be less sharp and detailed than in-focus pixels that are captured at the center of a second depth-of-field.

In some embodiments, generating (at 308) the fully in-focus composite image may be performed at the same time as a photogrammetry process that determines the 3D positioning for the constructs forming the 3D model representing the object or scene. In some such embodiments, once the positions of the constructs are determined, 3D generation system 100 may map those positions to the depth-of-field associated with each 2D image in order to determine the 2D image with a depth-of-field that captures the determined 3D position of a particular construct in focus.

The generated (at 308) fully in-focus composite image has a consistent sharpness and level-of-detail as the pixels forming the fully in-focus composite image and represent the best image quality that the imaging device is capable of producing. In other words, there is no difference between the in-focus pixels that form the fully in-focus composite image as none of the in-focus pixels experience quality or sharpness degradation that occurs when a pixel is more and more out-of-focus.

Figure 4:
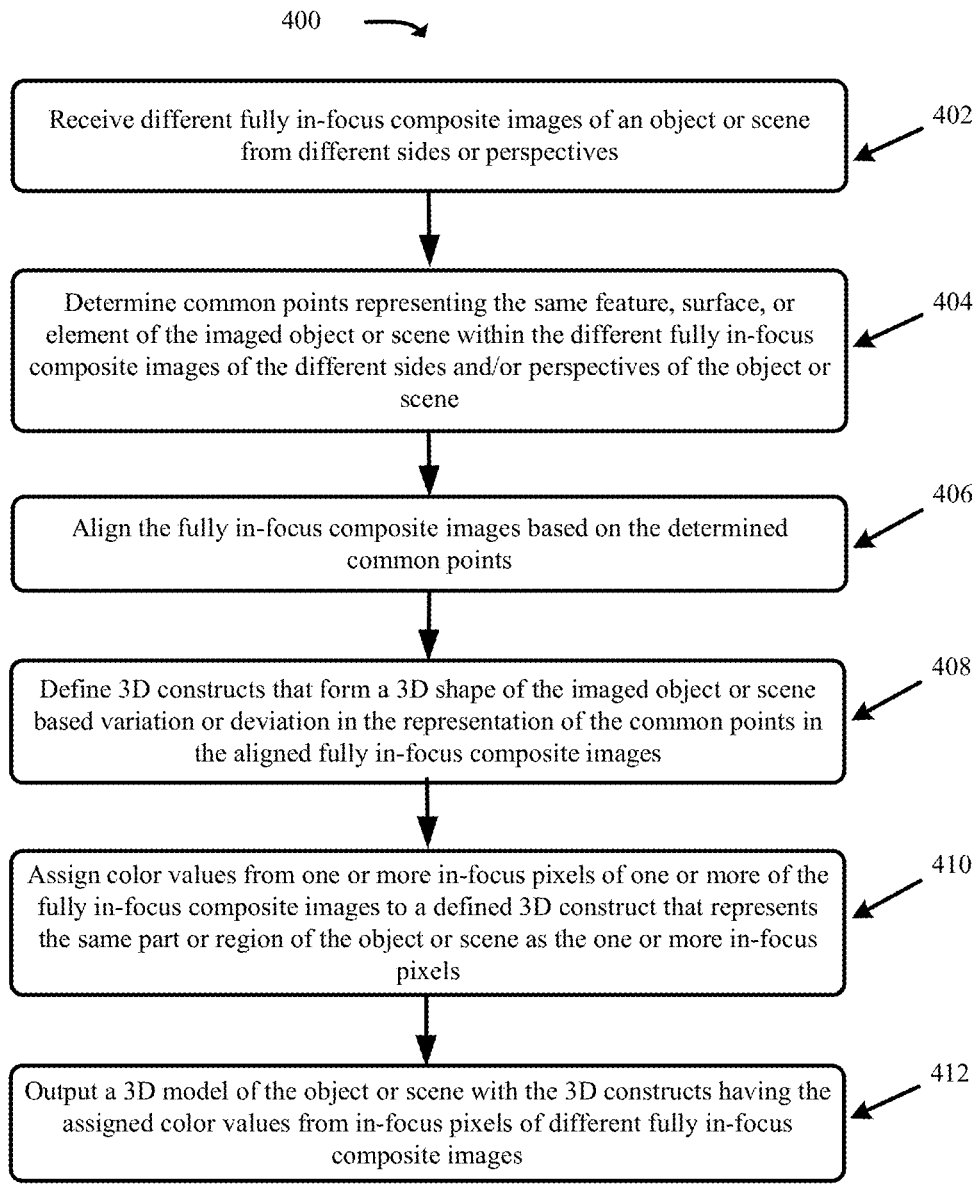
FIG. 4 presents a process for generating a consistently sharp, detailed, and in-focus 3D model representing an object from the fully in-focus 2D composite images that capture the object from different sides or perspectives in accordance with some embodiments presented herein.

FIG. 4 presents a process 400 for generating a consistently sharp, detailed, and in-focus 3D model representing an object from the fully in-focus 2D composite images that capture the object from different sides or perspectives in accordance with some embodiments presented herein. Process 400 is implemented by 3D generation system 100.

Process 400 includes receiving (at 402) different fully in-focus composite images of an object or scene from different sides or perspectives. The pixels of each fully in-focus composite image have a consistent sharpness and level of detail because the image data is sourced from in-focus pixels of multiple different images.

Process 400 includes determining (at 404) common points representing the same feature, surface, or element of the imaged object or scene within the different fully in-focus composite images of the different sides and/or perspectives of the object or scene. For instance, a first fully in-focus composite image may be an image of the front side of the object or scene, and a second fully in-focus composite image may be an image of a left side of the object or scene. The composite images may partially overlap and capture the same part of the object or scene from the different sides or perspectives. 3D generation system 100 determines (at 404) the common points by identifying common forms, shapes, or structures in the images that have similar or identical coloring.

Process 400 includes aligning (at 406) the fully in-focus composite images based on the determined (at 404) common points. The aligned (at 406) fully in-focus composite images provide a complete view of the imaged object or scene from all sides albeit with 2D images.

Process 400 includes defining (at 408) 3D constructs that form a 3D shape of the imaged object or scene based variation or deviation in the representation of the common points in the aligned (at 406) fully in-focus composite images. For instance, 3D generation system 100 analyzes the common points in the different composite images, and calculates an amount by which the common points in one composite image are distorted, skewed, or otherwise varied compared to the same common points in another composite image. 3D generation system 100 determines a 3D position and shape for the common points based on the calculated variations, and defines (at 408) the 3D constructs at the determined 3D positions with the determined shapes. In some embodiments, the 3D constructs are data points that are distributed in a 3D space of a point cloud, or are meshes and/or polygons that are connected to form a 3D model of the object or scene.

Process 400 includes assigning (at 410) color values from one or more in-focus pixels of one or more of the fully in-focus composite images to a defined (at 408) 3D construct that represents the same part or region of the object or scene as the one or more in-focus pixels. In some embodiments, 3D generation system 100 determines the in-focus pixels that are aligned with a defined (at 408) 3D construct or that were used to define (at 408) the 3D construct, and maps the color values and/or other image data associated with the in-focus pixels to the defined (at 408) 3D construct. For instance, the red, green, blue, and/or other color components of an in-focus pixel from one of the fully in-focus composite images are mapped to and/or used to define the red, green, blue, and/or other color components of a 3D model construct that represents the same surface point or feature point of the object or scene as the in-focus pixel.

Process 400 includes outputting (at 412) a 3D model of the object or scene with the 3D constructs having the assigned (at 410) color values from in-focus pixels of different fully in-focus composite images. Since each 3D construct of the 3D model has its position and/or visual characteristics derived from one or more in-focus pixels, the 3D constructs inherit and map the sharpness and detail with which the object or scene is imaged in two dimensions over to the 3D model of the object or scene. In other words, if a first set of 3D constructs were defined and assigned from in-focus pixels and a second set of 3D constructs were defined and assigned from out-of-focus pixels, then the 3D model would inconsistently have sharp and detailed regions wherever the first set of 3D constructs form parts of the 3D model, and blurry and low resolution regions wherever the second set of 3D constructs form parts of the 3D models. However, the consistent definition (at 408) and assignment (at 410) of the 3D constructs based on in-focus pixels ensures that the 3D model has a consistent and/or uniform resolution, detail, and/or sharpness across its entire form at all sides and/or from all viewing perspectives.

In some embodiments, 3D generation system 100 directly generates a 3D model from the multiple 2D images that capture the same side or perspective of an object with different depths-of-field. The 2D images include in-focus and out-of-focus pixels, and 3D generation system 100 generates the 3D model by differentiating the in-focus pixels from the out-of-focus pixels when defining the 3D constructs and assigning the color values to the 3D constructs. Accordingly, 3D generation system 100 may generate a consistently sharp, detailed, and in-focus 3D model without first performing the focus stacking procedure to generate the fully in-focus composite images.

In some embodiments, 3D generation system 100 defines the positions of the 3D constructs based on outputs from a 3D imaging device or scanner, and defines the color values and/or other non-positional elements of each particular 3D construct by differentiating between in-focus pixels and out-of-focus pixels from different images that capture the surface, feature, or point represented by that particular 3D construct from different depths-of-field and by mapping the color values and/or non-positional elements from the in-focus pixels to the particular 3D construct. In other words, 3D generation system 100 the photogrammetry construction of the 3D model may be replaced with a 3D scan of the object or scene that is then colorized using the focus stacked 2D images of the object or scene.

Figure 5:
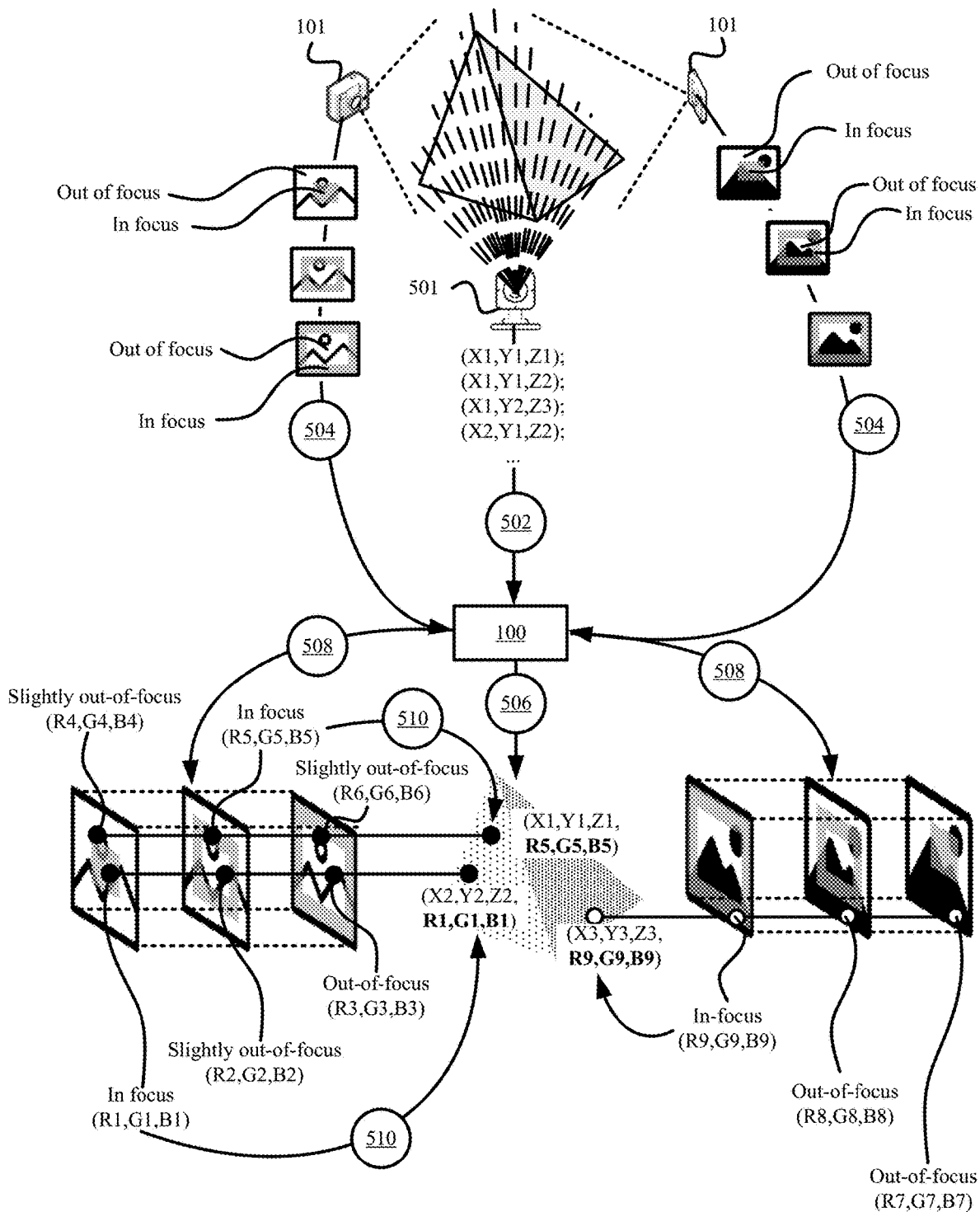
FIG. 5 illustrates an example of generating a consistently sharp, detailed, and in-focus 3D model by selectively colorizing a 3D scan of an object using in-focus pixels from different sets of 2D images that capture the object at varying depths-of-field in accordance with some embodiments presented herein.

FIG. 5 illustrates an example of generating a consistently sharp, detailed, and in-focus 3D model by selectively colorizing a 3D scan of an object using in-focus pixels from different sets of 2D images that capture the object at varying depths-of-field in accordance with some embodiments presented herein. 3D generation system 100 receives (at 502) 3D positional data of a scanned object from scanner 501, and receives (at 504) different sets of 2D images that capture the object from different sides or perspectives with different depths-of-field from imaging device 101.

Scanner 501 may be a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, structured or patterned light imaging device, and/or other imaging equipment for 3D objects, volumetric objects, or 3D environments. Scanner 501 accurately measures the position of each point from each surface, feature, and/or element of the object based on the intensity and/or time with which lasers, light, sound, and/or other signals reflect off each point, the distortion of a structured or patterned light at each point, and/or other depth measuring techniques. In some embodiments, scanner 501 may measure the position of each point within a micrometer of position, and the number of points measured by scanner 501 may be based on the density or number of lasers emitted from scanner 501 over a given area or region.

3D generation system 100 defines (at 506) the positions for the 3D constructs that form the 3D model of the object based on the positional data obtained from scanner 501. For instance, 3D generation system 100 may generate a point cloud with a set of data points that are distributed in a 3D space. Each data point of the set of data points may be defined with an x, y, and z coordinate position to represent the position of a corresponding point from a surface, feature, and/or element of the object scanned and/or measured by scanner 501. In some embodiments, the positional elements of the point cloud data points are defined directly from the positional data that is output by scanner 501.

Each point cloud data point may be defined with a plurality of elements. The plurality of elements may include a first set of positional elements, and a second set of non-positional or descriptive elements. The positional elements may include coordinates within 3D space that are defined according to the measurements of scanner 501. The non-positional elements may initially be empty or contain null values as scanner 501 may be capable of capturing positional information only.

3D generation system 100 may use the visual characteristics from in-focus pixels of the different sets of 2D images to define the non-positional elements of the point cloud data points. To perform the visual characteristic and/or non-positional element mapping, 3D generation system 100 aligns (at 508) the images from each set of 2D images. Specifically, 3D generation system 100 aligns (at 508) the pixels from different images that capture the same features, surfaces, or elements of the object at different depths-of-field. 3D generation system 100 also aligns (at 508) the pixels from each set of 2D images with the 3D constructs of the 3D model that represent the same points, features, surfaces, and/or elements of the object as the pixels. In some embodiments, 3D generation system 100 flattens the 3D shapes or forms of the 3D model so that they may be compared against and aligned with the same shapes or forms captured in the different sets of 2D images.

3D generation system 100 then selectively maps (at 510) color values and/or non-positional elements from the in-focus pixels from each set of 2D images to the color values and/or non-positional elements of the 3D constructs that are aligned with and represent the same points, features, surfaces, and/or elements as the in-focus pixels. For instance, 3D generation system 100 may determine that a first pixel of a first 2D image in a set of 2D images and a second pixel of a second 2D image in the second of 2D images image the same point about the object as a particular 3D construct of the 3D model. 3D generation system 100 analyzes the depth-of-field, metadata, and/or other data of the first 2D image and the second 2D image to determine that the first pixel is slightly out-of-focus because the first pixel is outside the depth-of-field of the first 2D image and that the second pixel is in-focus because the second pixel is inside the depth-of-field of the second 2D image. Accordingly, 3D generation system 100 defines the non-positional elements of the particular 3D construct using the color values and/or data associated with the second pixel.

Figure 6:
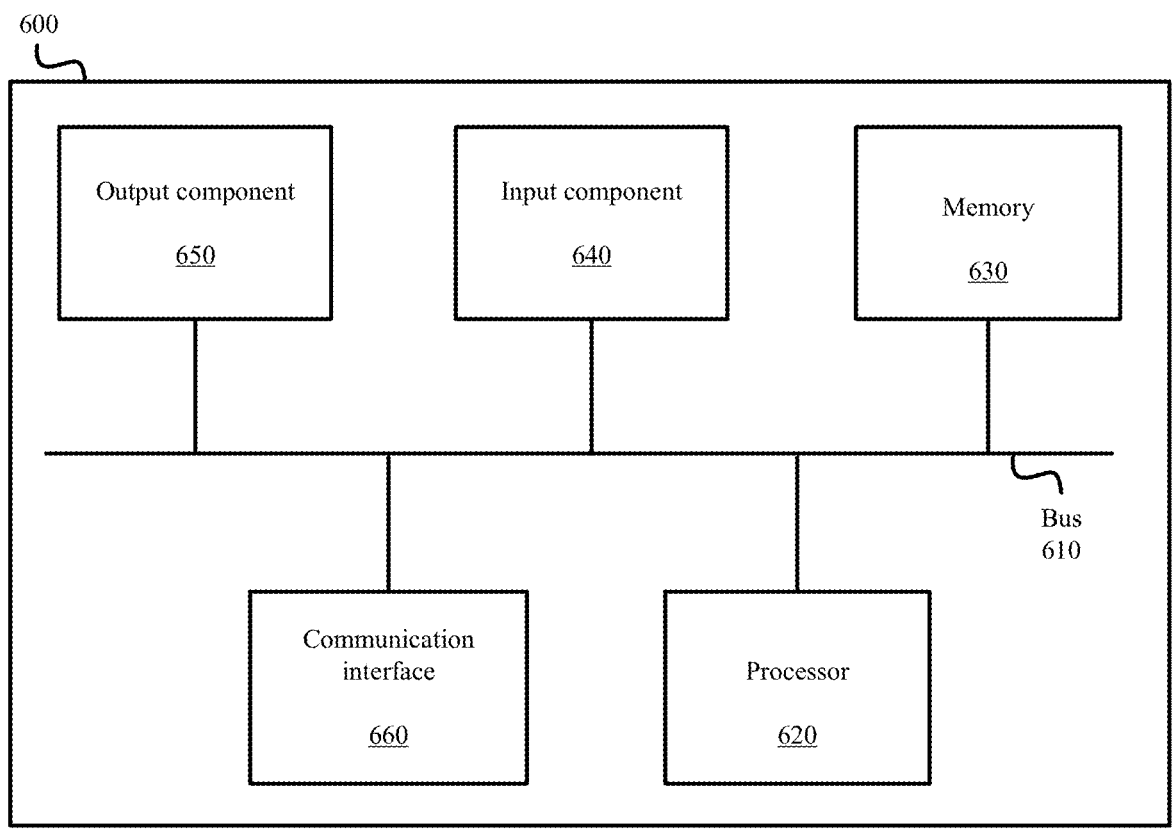
FIG. 6 illustrates example components of one or more devices, according to one or more embodiments described herein.

FIG. 6 is a diagram of example components of device 600. Device 600 may be used to implement one or more of the devices or systems described above (e.g., 3D generation system 100). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more LEDs, etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a plurality of two-dimensional ("2D") images of a particular part of an object or scene, wherein each 2D image of the plurality of 2D images comprises a plurality of pixels that capture the particular part of the object or scene with a different depth-of-field;
   determining a first pixel from a first 2D image of the plurality of 2D images and a second pixel from a second 2D image of the plurality of 2D images that represent a common point from the particular part of the object or scene;
   determining that the first pixel is out of focus based on the depth-of-field associated with the first 2D image and that the second pixel is in focus based on the depth-of-field associated with the second 2D image;
   selecting a particular three-dimensional ("3D") construct from a plurality of 3D constructs that are distributed in a 3D space and that collectively form a 3D model of the object or scene in response to the particular 3D construct of the 3D model corresponding to the common point from the particular part of the object or scene that is represented by the first pixel in the first 2D image and the second pixel in the second 2D image;
   mapping color values from the second pixel to the particular 3D construct in response to determining that the first pixel is out of focus and the second pixel is in focus and that the particular 3D construct, the first pixel, and the second pixel represent the common point from the particular part of the object or scene.

2. The method of claim 1 further comprising:
   determining a first set of pixels from the plurality of pixels of the first 2D image that provide an in-focus capture of first regions from the particular part of the object or scene, wherein the first regions from the particular part of the object or scene are out of focus in the plurality of pixels of the second 2D image;
   determining a second set of pixels from the plurality of pixels of the second 2D image that provide an in-focus capture of second regions from the particular part of the object or scene, wherein the second regions from the particular part of the object or scene are out of focus in the plurality of pixels of the first 2D image; and
   generating a first set of the plurality of 3D constructs based on the first set of pixels of the first 2D image and a second set of the plurality of 3D constructs based on the second set of pixels of the second 2D image, wherein the first set of 3D constructs provide a 3D representation of the first regions of the particular part of the object or scene and the second set of 3D constructs provide a 3D representation of the second regions of the particular part of the object or scene, and wherein the first set of 3D constructs are connected to the second set of 3D constructs.

3. The method of claim 1 further comprising:
   selecting a first set of pixels from the plurality of pixels of the first 2D image that provide an in-focus capture for first regions of the particular part of the object or scene;
   selecting a second set of pixels from the plurality of pixels of the second 2D image that provide an in-focus capture for second regions of the particular part of the object or scene that do not overlap with the first regions; and
   generating a composite image of the particular part of the object or scene from the first set of pixels and the second set of pixels, wherein the composite image provides a fully in-focus capture of the particular part of the object or scene.

4. The method of claim 1 further comprising:
   obtaining metadata of the first 2D image;
   determining a set of exposure settings used to capture the first 2D image from the metadata;
   calculating the depth-of-field of the first 2D image based on the set of exposure settings; and
   determining a first set of pixels from the plurality of pixels of the first 2D image that are in focus and a second set of pixels from the plurality of pixels of the first 2D image that are out of focus based on the depth-of-field that is calculated for the first 2D image.

5. The method of claim 1 further comprising:
   defining one or more of a shape, position, or form of the particular 3D construct based on the second pixel.

6. The method of claim 1 further comprising:
   defining positions for the plurality of 3D constructs in the 3D space based on positional measurements of the object or scene that are taken by a scanner; and
   defining colors for each 3D construct of the plurality of 3D constructs based on colors of in-focus pixels from the plurality of 2D images.

7. The method of claim 1, wherein each 2D image of the plurality of 2D images captures different aspects of the particular part of the object or scene in focus.

8. The method of claim 1 further comprising:
   generating the 3D model based on color values that are assigned from a first set of the plurality of pixels of the first 2D image that are in focus in the first 2D image to a first set of the plurality of 3D constructs and color values that are assigned from a second set of the plurality of pixels of the second 2D image that are in focus in the second 2D image to a second set of the plurality of 3D constructs forming the 3D model.

9. The method of claim 1 further comprising:
   determining a first set of pixels from the plurality of pixels of the first 2D image that are in the depth-of-field of the first 2D image and a second set of pixels from the plurality of pixels of the first 2D image that are outside the depth-of-field of the first 2D image, wherein the first set of pixels image a first region of the particular part of the object or scene and the second set of pixels image a second region of the particular part of the object or scene;

determining a third set of pixels from the plurality of pixels of the second 2D image that are in the depth-of-field of the second 2D image and a fourth set of pixels from the plurality of pixels of the second 2D image that are outside the depth-of-field of the second 2D image, wherein the third set of pixels image the second region of the particular part of the object or scene and the fourth set of pixels image the first region of the particular part of the object or scene; and generating the 3D model with a first set of the plurality of 3D constructs that provide a 3D representation of the first region of the particular part of the object or scene using image data from the first set of pixels that are in the depth-of-field of the first 2D image, and with a second set of the plurality of 3D constructs that provide a 3D representation of the second region of the particular part of the object or scene using image data from the third set of pixels that are in the depth-of-field of the second 2D image.

10. A system comprising:
one or more hardware processors configured to:
receive a plurality of two-dimensional ("2D") images of a particular part of an object or scene, wherein each 2D image of the plurality of 2D images comprises a plurality of pixels that capture the particular part of the object or scene with a different depth-of-field;
determine a first pixel from a first 2D image of the plurality of 2D images and a second pixel from a second 2D image of the plurality of 2D images that represent a common point from the particular part of the object or scene;
determine that the first pixel is out of focus based on the depth-of-field associated with the first 2D image and that the second pixel is in focus based on the depth-of-field associated with the second 2D image;
select a particular three-dimensional ("3D") construct from a plurality of 3D constructs that are distributed in a 3D space and that collectively form a 3D model of the object or scene in response to the particular 3D construct of the 3D model corresponding to the common point from the particular part of the object or scene that is represented by the first pixel in the first 2D image and the second pixel in the second 2D image;
map color values from the second pixel to the particular 3D construct in response to determining that the first pixel is out of focus and the second pixel is in focus and that the particular 3D construct, the first pixel, and the second pixel represent the common point from the particular part of the object or scene.

11. The system of claim 10, wherein the one or more hardware processors are further configured to:
determine a first set of pixels from the plurality of pixels of the first 2D image that provide an in-focus capture of first regions from the particular part of the object or scene, wherein the first regions from the particular part of the object or scene are out of focus in the plurality of pixels of the second 2D image;
determine a second set of pixels from the plurality of pixels of the second 2D image that provide an in-focus capture of second regions from the particular part of the object or scene, wherein the second regions from the particular part of the object or scene are out of focus in the plurality of pixels of the first 2D image; and
generate a first set of the plurality of 3D constructs based on the first set of pixels of the first 2D image and a second set of the plurality of 3D constructs based on the second set of pixels of the second 2D image, wherein the first set of 3D constructs provide a 3D representation of the first regions of the particular part of the object or scene and the second set of 3D constructs provide a 3D representation of the second regions of the particular part of the object or scene, and wherein the first set of 3D constructs are connected to the second set of 3D constructs.

12. The system of claim 10, wherein the one or more hardware processors are further configured to:
select a first set of pixels from the plurality of pixels of the first 2D image that provide an in-focus capture for first regions of the particular part of the object or scene;
select a second set of pixels from the plurality of pixels of the second 2D image that provide an in-focus capture for second regions of the particular part of the object or scene that do not overlap with the first regions; and
generate a composite image of the particular part of the object or scene from the first set of pixels and the second set of pixels, wherein the composite image provides a fully in-focus capture of the particular part of the object or scene.

13. The system of claim 10, wherein the one or more hardware processors are further configured to:
obtain metadata of the first 2D image;
determine a set of exposure settings used to capture the first 2D image from the metadata;
calculate the depth-of-field of the first 2D image based on the set of exposure settings; and
determine a first set of pixels from the plurality of pixels of the first 2D image that are in focus and a second set of pixels from the plurality of pixels of the first 2D image that are out of focus based on the depth-of-field that is calculated for the first 2D image.

14. The system of claim 10, wherein the one or more hardware processors are further configured to:
define one or more of a shape, position, or form of the particular 3D construct based on the second pixel.

15. The system of claim 10, wherein the one or more hardware processors are further configured to:
define positions for the plurality of 3D constructs in the 3D space based on positional measurements of the object or scene that are taken by a scanner; and
define colors for each 3D construct of the plurality of 3D constructs based on colors of in-focus pixels from the plurality of 2D images.

16. The system of claim 10, wherein the one or more hardware processors are further configured to:
generate the 3D model based on color values that are assigned from a first set of the plurality of pixels of the first 2D image that are in focus in the first 2D image to a first set of the plurality of 3D constructs forming the 3D model and color values that are assigned from a second set of the plurality of pixels of the second 2D image that are in focus in the second 2D image to a second set of the plurality of 3D constructs forming the 3D model.

17. The system of claim 10, wherein the one or more hardware processors are further configured to:
determine a first set of pixels from the plurality of pixels of the first 2D image that are in the depth-of-field of the first 2D image and a second set of pixels from the plurality of pixels of the first 2D image that are outside the depth-of-field of the first 2D image, wherein the first set of pixels image a first region of the particular part of the object or scene and the second set of pixels image a second region of the particular part of the object or scene;

determine a third set of pixels from the plurality of pixels of the second 2D image that are in the depth-of-field of the second 2D image and a fourth set of pixels from the plurality of pixels of the second 2D image that are outside the depth-of-field of the second 2D image, wherein the third set of pixels image the second region of the particular part of the object or scene and the fourth set of pixels image the first region of the particular part of the object or scene; and generate the 3D model with a first set of the plurality of 3D constructs that provide a 3D representation of the first region of the particular part of the object or scene using image data from the first set of pixels that are in the depth-of-field of the first 2D image, and with a second set of the plurality of 3D constructs that provide a 3D representation of the second region of the particular part of the object or scene using image data from the third set of pixels that are in the depth-of-field of the second 2D image.

18. A non-transitory computer-readable medium storing program instructions that, when executed by one or more hardware processors of a three-dimensional ("3D") generation system, cause the 3D generation system to perform operations comprising:

receiving a plurality of two-dimensional ("2D") images of a particular part of an object or scene, wherein each 2D image of the plurality of 2D images comprises a plurality of pixels that capture the particular part of the object or scene with a different depth-of-field;

determining a first pixel from a first 2D image of the plurality of 2D images and a second pixel from a second 2D image of the plurality of 2D images that represent a common point from the particular part of the object or scene;

determining that the first pixel is out of focus based on the depth-of-field associated with the first 2D image and that the second pixel is in focus based on the depth-of-field associated with the second 2D image;

selecting a particular three-dimensional ("3D") construct from a plurality of 3D constructs that are distributed in a 3D space and that collectively form a 3D model of the object or scene in response to the particular 3D construct of the 3D model corresponding to the common point from the particular part of the object or scene that is represented by the first pixel in the first 2D image and the second pixel in the second 2D image;

mapping color values from to the particular 3D construct in response to determining that the first pixel is out of focus and the second pixel is in focus and that the particular 3D construct, the first pixel, and the second pixel represent the common point from the particular part of the object or scene.

* * * * *